R. RICHARDI.
Machine for Making Wooden Trays.

No. 227,580.  Patented May 11, 1880.

Attest,
Paul Bakewell
Fred K. Lear

Inventor,
Robert Richardi
by Chas. D. Moody,
his atty.

R. RICHARDI.
Machine for Making Wooden Trays.

No. 227,580. Patented May 11, 1880.

Attest,
Paul Bakewell.
Fred'k Lear

Inventor,
Robert Richardi
by Chas. D. Moody,
his atty.

R. RICHARDI.
Machine for Making Wooden Trays.
No. 227,580.  
3 Sheets—Sheet 3.  
Patented May 11, 1880.
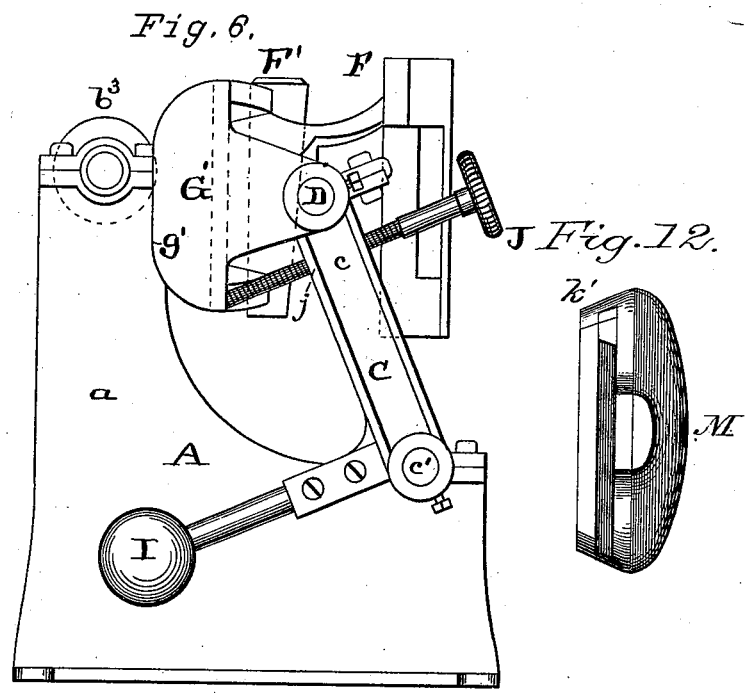
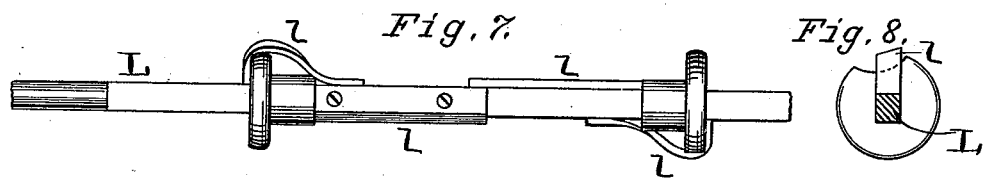
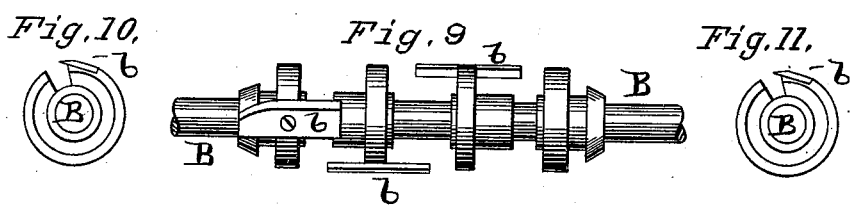
Attest,  
Paul Bakewell.  
Fredk Lear
Inventor,  
Robert Richardi,  
by Chas. A. Moody,  
his atty.

UNITED STATES PATENT OFFICE.

ROBERT RICHARDI, OF LOUISIANA, MISSOURI.

MACHINE FOR MAKING WOODEN TRAYS.

SPECIFICATION forming part of Letters Patent No. 227,580, dated May 11, 1880.

Application filed December 22, 1879.

*To all whom it may concern:*

Be it known that I, ROBERT RICHARDI, of Louisiana, Missouri, have made a new and useful Improvement in Machines for Making Wooden Trays and other Wooden Articles, of which the following is a full, clear, and exact description, reference being had to the annexed drawings, making part of this specification, in which—

Figure 1:
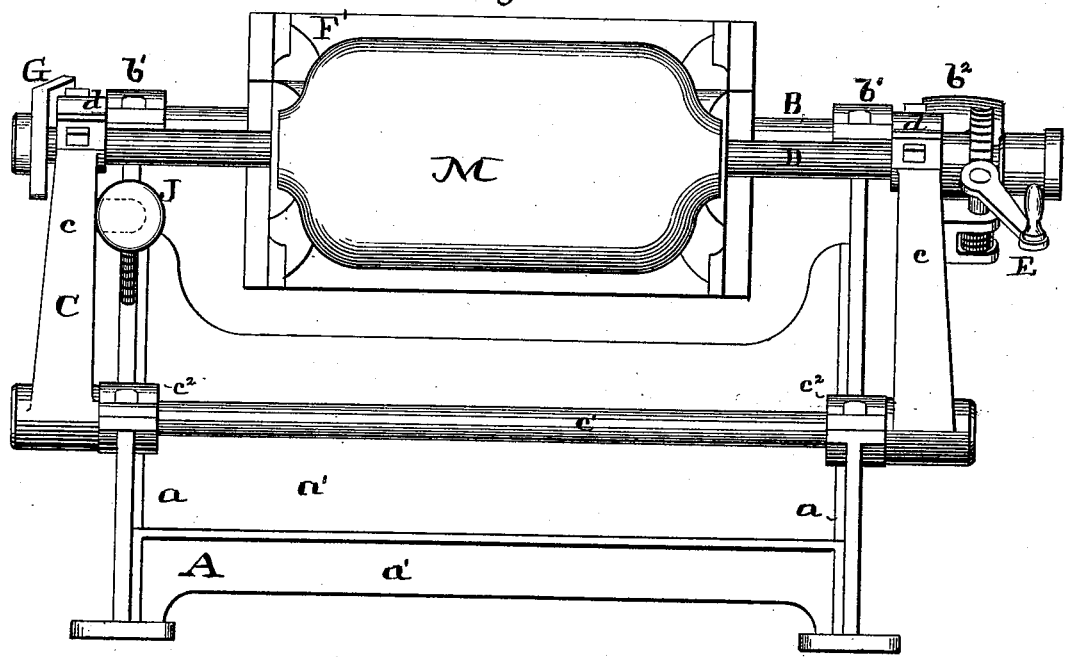
Figure 2:
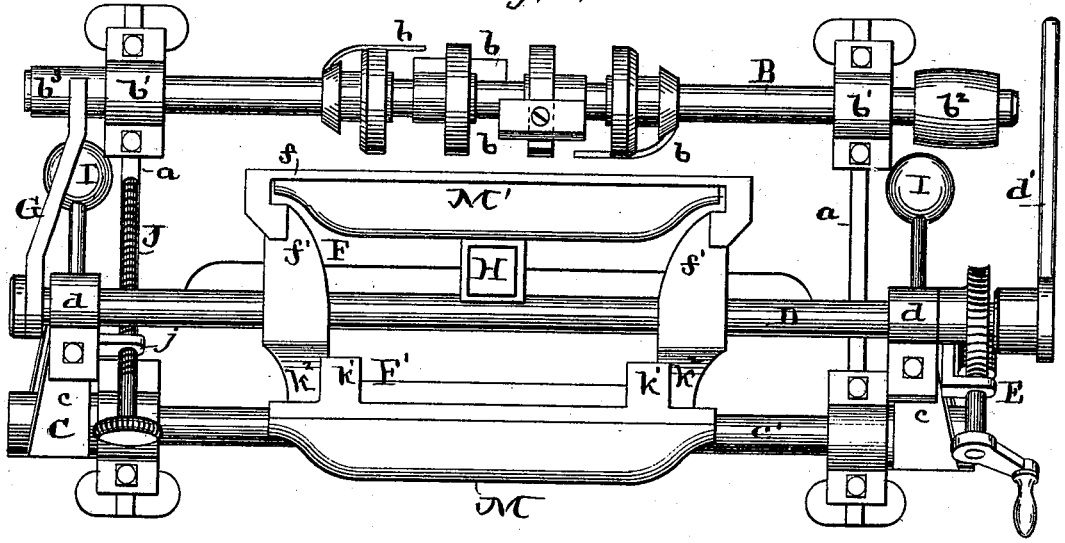
Figure 3:
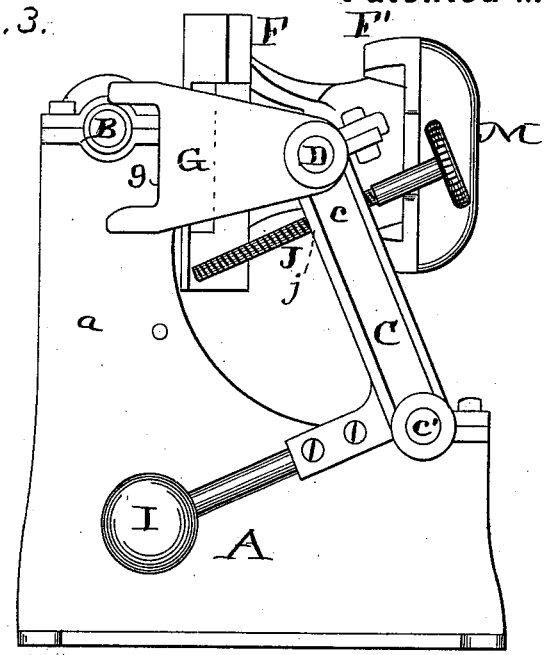
Figure 4:
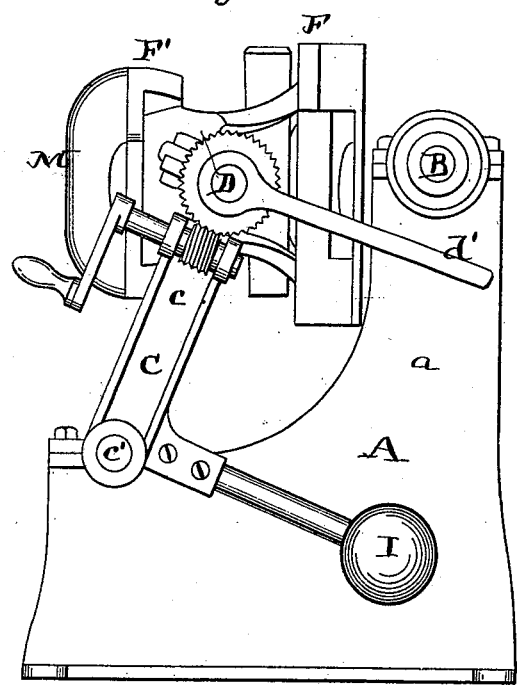
Figure 5:
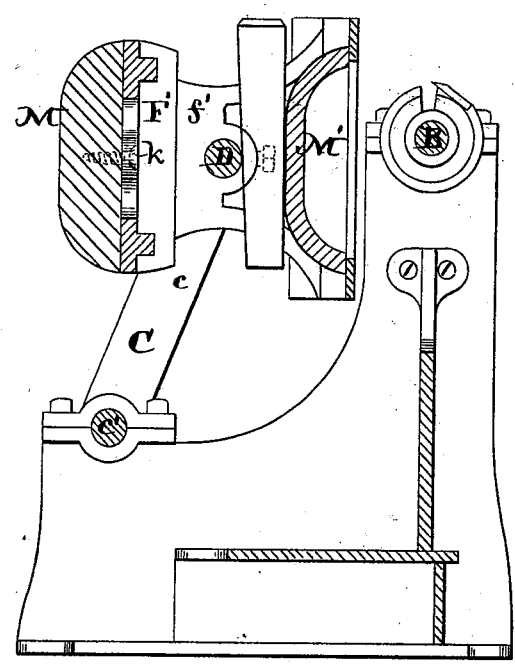

Figure 1 is a front elevation of the improved machine; Fig. 2, a plan; Fig. 3, an end elevation, the parts being arranged as for cutting the inside of the tray; Fig. 4, an elevation of the opposite end to that shown in Fig. 3; Fig. 5, a cross vertical section; Fig. 6, an elevation similar to that of Fig. 3, but the parts being as for shaping the outside of the tray; Fig. 7, a detail, being a view of the cutter used in shaping the outside of the tray; Fig. 8, an end elevation of the last-named cutter; Fig. 9, a view of the cutter for shaping the inside of the tray, and Figs. 10 and 11 cross-sections of the last-named cutter. Fig. 12 is an end view of the chuck for holding the wood while the outside of the tray is shaped.

The same letters denote the same parts.

The present improvement has relation more especially to the combination, with the cutter, of the means used for holding and presenting the blank thereto.

Considered generally, the machine consists mainly of a cutter-shaft having cutters shaped and arranged properly and to suit the intended shape of the tray, a tilting frame carrying a rotating chuck-shaft and chucks, and a suitable frame for supporting the cutting and blank-presenting mechanism. The tilting frame is used to move the chucked blank to and from the cutter, and the rotating feature of the chuck-shaft supplements the tilting frame in presenting all portions of the blank properly to the cutter. The movements of the tilting frame and chuck-shaft are regulated by suitable mechanism, as appears more fully in the following detailed description.

Referring to the drawings, A represents the frame of the machine, having the uprights $a\ a$, connected by suitable cross-pieces $a'\ a'$. B, Figs. 1, 2, represents the cutter-shaft, the cutters $b\ b\ b$, Fig. 2, being shaped to form the inside of the tray. The shaft is journaled in the frame at $b'\ b'$, and is furnished with a pulley, $b^2$, through which motion is communicated to the shaft. It is also provided with a loose sleeve, $b^3$, to relieve the friction of the patterns which come against the shaft, as hereinafter described.

C represents a frame which supports the blank, and which can be tilted to move the latter to and from the cutter. The frame consists of arms $c\ c$, fastened to a shaft, $c'$, which turns in bearings $c^2\ c^2$.

A chuck-shaft, D, is journaled in the arms $c\ c$ at $d\ d$. It can be turned therein either by the lever $d'$ or the worm-gear E. It supports the chuck F F' and the pattern G, Figs. 1, 2, 3. The chuck is fastened to the chuck-shaft and turns with it, and it has two sides—one, F, to hold the blank in shaping the inside of the tray, and the other, F', in shaping the outside of the tray. The side F has a face-plate, $f$, attached to the arms $f'\ f'$.

The unfinished blank is held against the plate by any suitable means—say, a wedge, H, Fig. 2. The plate is perforated or cut away to enable the cutter to come in contact with the blank.

To form the inside of the tray, fasten the blank against the plate $f$ by driving the wedge H between the blank and the chuck-shaft, and tilt the frame C toward the cutter. If its weight is insufficient to hold it steadily, weights I I can be added. In starting in, the screw J, which is held in the tilting frame at $j$, and the point of which bears against or can be made to bear against some fixed part of the machine, is used to feed the blank gradually to the cutter until the pattern G touches the sleeve $b^3$. The pattern is shaped to conform to the inside of the tray and as shown in Fig. 3.

After the pattern has come to bear upon the sleeve, the chuck-shaft is turned forward and backward to bring all parts of the edge $g$ of the pattern against the sleeve, thereby giving the blank the proper shape upon the inside.

To form the outside of the tray, the blank, by means of screws $k$, Fig. 5, is fastened to a plate or frame, F'. The latter is then attached to the chuck-arms $f'\ f'$, the plate being furnished with lugs $k'\ k'$, which engage in grooves $k^2\ k^2$ in the arms $f'\ f'$. Any suitable means can be used to fasten the plate in the arms, the wedge H being the preferable mode. The chuck-shaft is then rotated to properly present the blank to the cutter, and the frame C tilted, as before, to bring the blank against the cutter, and as in Fig. 6.

The screw J is not used in shaping the outside of the tray, and in place of the pattern G another pattern, G', Fig. 6, is employed, the edge $g'$ of the pattern conforming to the outside of the tray. Also, in place of the cutters $b\ b\ b$, a series of cutters, $l\ l$, Fig. 7, are used.

To facilitate the changing of the cutters, each set, $b\ b\ b$ or $l\ l$, may be attached to a separate shaft, as shown at B, Figs. 9, 10, 11, and at L, Figs. 7, 8, respectively.

In forming the outside of the tray the chuck-shaft is rotated, as before, to bring the entire edge $g'$ against the sleeve $b^3$.

It is desirable to shape the bottom of the tray first, as shown at M. The top or inside can then be shaped, as shown at M'. A cam can be used in place of the screw J.

I claim—

1. The combination of the cutter-shaft B, having suitable cutters, the sleeve $b^3$, loosely fitted on said shaft, the tilting frame C, and the chuck-shaft D, rotating as described, and provided with a pattern, G or G', and the chucks F F', arms $f f'$, and wedge H, substantially as described.

2. The combination of the chucks F F', arms $f f'$, sustaining said chucks, the wedge H, and the shaft D, substantially as described.

ROBERT RICHARDI.

Witnesses:
   CHAS. D. MOODY,
   PAUL BAKEWELL.